US 8,634,646 B2

(12) United States Patent
Almodovar Herraiz et al.

(10) Patent No.: US 8,634,646 B2
(45) Date of Patent: Jan. 21, 2014

(54) METHOD AND SYSTEM FOR RECOMMENDING PHOTOGRAPHS

(75) Inventors: Daniel Almodovar Herraiz, Madrid (ES); Francisco Javier Rubio Andres, Madrid (ES); Miguel Angel Touset Rios, Madrid (ES)

(73) Assignee: Vodafone Group PLC, Newbury, Berkshire (GB)

( * ) Notice: Subject to any disclaimer, the term of this patent is extended or adjusted under 35 U.S.C. 154(b) by 614 days.

(21) Appl. No.: 12/795,549

(22) Filed: Jun. 7, 2010

(65) Prior Publication Data

US 2011/0002543 A1    Jan. 6, 2011

(30) Foreign Application Priority Data

Jun. 5, 2009  (ES) .................................. 200930270

(51) Int. Cl.
   *G06K 9/46*    (2006.01)
(52) U.S. Cl.
   USPC ............ 382/190; 382/224; 382/226; 382/228
(58) Field of Classification Search
   USPC .................................. 382/190, 224, 226, 228
   See application file for complete search history.

(56) References Cited

U.S. PATENT DOCUMENTS

| 6,999,624 | B1* | 2/2006 | Nelson ........................... 382/224 |
| 6,999,625 | B1* | 2/2006 | Nelson ........................... 382/224 |
| 7,076,097 | B2* | 7/2006 | Kondo et al. .................. 382/190 |
| 7,099,860 | B1* | 8/2006 | Liu et al. ................................ 1/1 |
| 7,529,732 | B2* | 5/2009 | Liu et al. ................................ 1/1 |
| 7,809,192 | B2* | 10/2010 | Gokturk et al. ............... 382/176 |
| 8,165,378 | B2* | 4/2012 | Fritz et al. ..................... 382/131 |
| 8,194,934 | B2* | 6/2012 | Eura et al. ..................... 382/115 |
| 8,194,986 | B2* | 6/2012 | Conwell ........................ 382/224 |
| 8,311,291 | B2* | 11/2012 | Yonezawa et al. ............ 382/118 |
| 8,351,665 | B2* | 1/2013 | Tearney et al. ................ 382/128 |
| 8,385,685 | B2* | 2/2013 | Bedros et al. ................. 382/284 |
| 2004/0126038 | A1 | 7/2004 | Aublant et al. |
| 2005/0058350 | A1* | 3/2005 | Dugan et al. ................... 382/224 |
| 2006/0173746 | A1* | 8/2006 | Cooper et al. ................... 705/26 |
| 2006/0210121 | A1* | 9/2006 | Nakano et al. ................ 382/117 |
| 2006/0262976 | A1* | 11/2006 | Hart et al. ...................... 382/190 |
| 2007/0047819 | A1* | 3/2007 | Hull et al. ...................... 382/190 |
| 2007/0177805 | A1* | 8/2007 | Gallagher ...................... 382/190 |
| 2007/0297675 | A1* | 12/2007 | Lee et al. ....................... 382/190 |

(Continued)

FOREIGN PATENT DOCUMENTS

EP       1202187       5/2002

OTHER PUBLICATIONS

Kim et al Relevance Feedback Using Adaptive Clustering for Content Based Image Retrieval, In Proc. of the ACM SIGMOD Int. Conf. on Management of Data, 2003.*

*Primary Examiner* — Jayesh A Patel
*Assistant Examiner* — Iman Kholdebarin
(74) *Attorney, Agent, or Firm* — Workman Nydegger

(57) ABSTRACT

Method for recommending photographs chosen from a set of digital photographs, comprising:
  a tagging step for tagging the digital photographs according to determined objective parameters obtained from their own features and determined subjective parameters obtained from users' behaviour toward said photographs;
  a tuning step for obtaining a tuning score $score_t$ for each photograph by weighing their objective and subjective parameters according to a relevant function;
  starting from the tuning score of each photograph, obtaining a total score $score_{TOTAL}$ for each photograph;
  provide the at least one user with the photographs recommendation according to the total score $score_{TOTAL}$ of each photograph.

16 Claims, 2 Drawing Sheets

(56) References Cited

U.S. PATENT DOCUMENTS

| | | | |
|---|---|---|---|
| 2008/0181508 A1* | 7/2008 | Kaneda et al. | 382/190 |
| 2008/0310725 A1* | 12/2008 | Kurata et al. | 382/190 |
| 2008/0313214 A1* | 12/2008 | Duhig et al. | 707/102 |
| 2009/0003707 A1* | 1/2009 | Fukuda et al. | 382/190 |
| 2009/0024580 A1* | 1/2009 | Obrador | 707/3 |
| 2009/0064008 A1* | 3/2009 | Liu et al. | 715/764 |
| 2009/0297010 A1* | 12/2009 | Fritz et al. | 382/131 |
| 2009/0324049 A1* | 12/2009 | Kontos et al. | 382/132 |
| 2010/0049740 A1* | 2/2010 | Iwase et al. | 707/104.1 |
| 2010/0086176 A1* | 4/2010 | Yokono et al. | 382/103 |
| 2010/0172555 A1* | 7/2010 | Hasezawa et al. | 382/128 |
| 2010/0312609 A1* | 12/2010 | Epshtein et al. | 705/10 |
| 2011/0002543 A1* | 1/2011 | Almodovar Herraiz et al. | 382/190 |
| 2011/0208716 A1* | 8/2011 | Liu et al. | 707/710 |
| 2012/0177294 A1* | 7/2012 | Ke et al. | 382/197 |
| 2012/0207360 A1* | 8/2012 | Mehanian et al. | 382/128 |
| 2012/0314913 A1* | 12/2012 | Bedros et al. | 382/117 |

* cited by examiner

| | OBJECTS | | | PEOPLE | | | PLACES | | | |
|---|---|---|---|---|---|---|---|---|---|---|
| | Object 1 Weight o1 | Object 2 Weight o2 | Object N Weight oN | Person 1 Weight p1 | Person 2 Weight p2 | Person M Weight pM | Place 1 Weight l1 | Place 2 Weight l2 | Place P Weight lP | |
| Photo 1 | Weight o1 * P_O1 | Weight o2 * P_O2 | Weight oN * P_ON | Weight p1 * P_P1 | Weight p2 * P_P2 | Weight pM * P_PM | Weight l1 * P_L1 | Weight l2 * P_L2 | Weight lP * P_LP | Score 1 |
| Photo 2 | | | | | | | | | | Score 2 |
| ,,, | | | | | | | | | | ,,, |
| Photo K | | | | | | | | | | Score K |

Fig. 3

| | OBJECTS | | PEOPLE | | PLACES | |
|---|---|---|---|---|---|---|
| | Object 1 Weight 1 | Object 2 Weight 2 | Person 1 Weight 3 | Person 2 Weight 4 | Place 1 Weight 5 | Place 2 Weight 6 |
| Photo 1 | yes | yes | yes | no | yes | no |
| Photo 2 | yes | no | yes | yes | no | yes |
| Photo 3 | no | no | no | no | yes | no |

Fig. 4A

| | OBJECTS | | PEOPLE | | PLACES | | SCORE |
|---|---|---|---|---|---|---|---|
| | Object 1 | Object 2 | Person 1 | Person 2 | Place 1 | Place 2 | |
| | 0,17 | 0,17 | 0,17 | 0,17 | 0,17 | 0,17 | |
| Photo 1 | 0,17 | 0,17 | 0,17 | no | 0,17 | no | 0,67 |
| Photo 2 | yes | no | 0,17 | 0,17 | no | 0,17 | 0,50 |
| Photo 3 | no | no | no | no | 0,17 | no | 0,17 |

Fig. 4B

METHOD AND SYSTEM FOR RECOMMENDING PHOTOGRAPHS

CROSS-REFERENCES AND RELATED APPLICATIONS

This application claims the benefit of the Spanish Patent Application No. ES P200930270, filed on Jun. 5, 2009, which is hereby incorporated by reference in its entirety.

FIELD

Embodiments of the present invention relate to the field of digital photography, and more specifically in providing an automatic photo recommender according to objective and subjective parameters.

BACKGROUND

The amount of multimedia information generated by our users is dramatically increasing nowadays. In particular, the number of photographs that are taken, uploaded to web servers, needed to be reviewed and processed, or simply shared with others (e.g. after a holiday trip) is unmanageable by individuals. Then, there is a clear need to automate the process of photo selection.

For professional photographers the problem is basically the same: a big amount of photographs taken during sessions (e.g. fashion week events) which need to be reviewed, selected and post-processed. A tool which simplifies their workflow and facilitates their job in the darkroom is really a must for most of them. Take into account that most of professional photographers are freelance, and then they appreciate very much to dedicate more time to take photos and to deal with potential customers.

The selection of photos is currently done based on user's rating, tagging or any kind of metadata (e.g. camera model, shutter speed, f-stop, ISO and so on) but not considering other parameters regarding user's behaviour.

For instance, patent document US2004126038 discloses an external device that tags photographs from cameras. However the present invention makes use of tagging in a first step (then the better the tagging is, the better the results are) but another ones are required as prefiltering, filtering and tuning to sort them properly.

Document US2006173746 discloses an efficient methods for temporal event clustering of digital photographs. It deals with the clustering of photographs considering their timestamps. The present invention is not related to the clustering of photographs but to find the optimal number of photos and its order to be shown them to each user.

SUMMARY OF DISCLOSED EMBODIMENTS

Embodiments of the present invention relate to the automation of the very tedious process of photo selection. Disclosed methods take into account the user preferences, and maximizing the quality of the photos and the amount of information shown.

Disclosed embodiments provide a number of advantages, including but not limited to:

When user's photos are uploaded to web servers like Flickr, a photo sharing website, embodiments of the present invention can make use of the tagging of the photos previously done by the users. The photos could be stored in a database with its corresponding tag. This information will complement the user's profile and be useful for other services, e.g. recommendation ones: recommend a near location with a high number of top valued photos, etc.

Disclosed embodiments improve the user experience, because:

The user can save time,

The user can see the most remarkable and high quality photos, which could be shared with others or printed in a shop, The user can have some criteria to improve his or her photographic skills.

It can allow the ability to deal with the majority of the individuals, e.g. in a free version of the service, and high skilled ones (e.g. the segment of professional photographers) in an optimized and non-free service model.

Data traffic increase: Disclosed embodiments promote the use of remote servers and is a good option to upload photos and download the result (set of best photos, slideshow, etc).

To provide these and other advantages, disclosed embodiments relate to methods for recommending photographs. In an example method, the recommended photographs are chosen from a set of digital photographs, and said recommendation is provided to at least one user. An example method comprises:

a tagging step for tagging the digital photographs according to determined objective parameters obtained from their own features and determined subjective parameters obtained from users' behaviour toward said photographs;

a tuning step for obtaining a tuning score $score_t$ for each photograph by weighing their objective and subjective parameters according to a relevant function;

starting from the tuning score of each photograph, obtaining a total score $score_{TOTAL}$ for each photograph;

provide the at least one user with the photographs recommendation according to the total score $score_{TOTAL}$ of each photograph.

In the relevant function of the tuning step tuning weighs weighT are preferably assigned to each objective and subjective parameter, such that:

$$\sum_{i=1}^{k} weighT_i = M$$

being:

k the number of the determined objective and subjective parameters, $weighT_i$ the weigh assigned to the parameter i, M the maximum score obtainable in the tuning step;

The score obtained for each photograph in the tuning step, tuning score $score_t$, can then be obtained by applying the following equation:

$$score_t = \sum_{i=1}^{k} weighT_i \cdot fp_i$$

being $fp_i$, equal to 0 in case parameter i is not present in said photograph, and 1 in case parameter i is present in said photograph.

The method can also comprise a prefiltering phase, before the tuning step, for discarding photographs according to objective and/or subjective parameters. The prefiltering phase can be carried out by configuring a threshold for at least one objective parameter and comparing said threshold with the value of the corresponding objective parameters obtained in the tagging step.

The method can also comprise a filtering step, after the tuning step. The filtering step preferably comprises:
identify the different items photographed in the photographs which have not been discarded yet;
for each photograph not yet discarded, making up a list of items photographed in said photograph;
assigning a weigh to each item;
for each photograph, obtaining a filtering score $score_f$ according to the items present in said photograph and according to filtering weighs weighF assigned to each item.

The filtering weighs weighF can be assigned to each item such that:

$$\sum_{i=1}^{j} weighF_i = N$$

being:
j the number of items identified,
$weighF_i$ the weigh assigned to the item i,
N the maximum score obtainable in the filtering step;

The score obtained for each photograph in the filtering step, filtering score $score_f$, can be obtained by applying the following equation:

$$score_f = \sum_{i=1}^{j} weighF_i \cdot f_i$$

being $f_i$ equal to 0 in case item i is not present in said photograph, and 1 in case item i is present in said photograph.

The items photographed can be, at least, of the following type: people, objects and places.

The total score $score_{TOTAL}$ of each photograph can be equal to its tuning score $score_t$, in case there is no filtering step. If there is a filtering step, the total score $score_{TOTAL}$ of each photograph is preferably such that $score_{TOTAL} = \alpha \cdot score_t + \beta \cdot score_f$, being $\alpha$, $\beta$ configurable parameters.

The recommended photographs finally showed can be a determined number T of photographs, with T<K, being K the total number of photographs of the set.

The relevant function in the tuning step can be automatically tuned in an iterative and learning process.

The objective parameters can be selected, at least, from the following:
the number of people and objects present in the photograph;
place where the photograph has been taken;
time stamp;
the photograph has been post-processed or not;
composition rule followed by the photograph;
quality of the focus of the main subject;
number of people with closed eyes;
number of people smiling;
exposure parameters.

The subjective parameters can be selected, at least, from the following:
number of times the photograph has been displayed;
time spent by users watching the photograph;
number of times the photograph has been sent to others;
number of receivers of the photograph;
if the photograph has been explicitly selected by the user;
if the photo has been shared or not;
number of downloads of the photograph;
mark assigned by user to the photograph;
number of comments to the photograph.

Disclosed embodiments are also directed to a system for recommending photographs. The disclosed system comprises an electronic device which in turn comprises storing means in which the set of digital photographs are stored and data processing means configured to execute the method for recommending photographs previously discussed.

The electronic device can be a computer with display means configured to show the at least one user the photographs recommendation.

BRIEF DESCRIPTION OF THE DRAWINGS

A series of drawings which aid in better understanding the invention and which are expressly related with an embodiment of said invention, presented as a non-limiting example thereof, are very briefly described below.

FIG. 3 shows a table used to obtain the score of the photos, according to different weights.

FIGS. 4A and 4B shows an example for scoring photos.

DESCRIPTION OF A PREFERRED EMBODIMENT OF THE INVENTION

Embodiments of the present invention are directed to an advanced method to sort a set of photographs which maximizes the amount of information contained in this set and matches with the user's likes. The example method is based on the following steps:
1. Tagging.
2. Prefiltering (optional).
3. Tuning.
4. Filtering (optional).
5. Show results to the user.

1. Tagging

Based on objective parameters (as people and objects photographed, framing, main subject is well focused, inside/outside, closed eyes, smiling . . . ) and subjective parameters collected from the user's behaviour (as number of times it has been displayed, time you've spent watching it, it's been shared or not and the number of times, stars, more comments, explicitly selected by the user . . . ). The tagging phase can be automatically done, because the image recognition technology is mature enough to implement it.

Objective Parameters

The number of people and objects present in a photograph. The photo could be tagged with two parameters: the number of people present, and the number of objects present.

Place where the photograph has been taken: e.g. inside or outside, or the GPS coordinates.

Time stamp.

The image has been post-processed or not, e.g. using Photoshop or other edition program.

Figure 1:
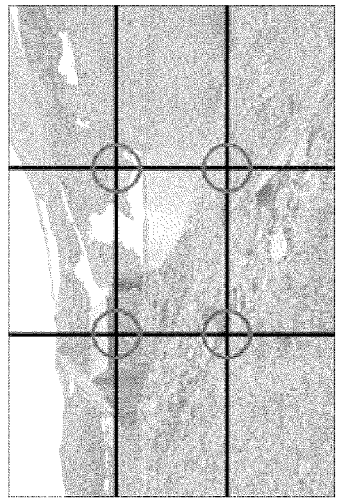
FIG. 1 shows an example for selecting objective parameters according to the composition rules, and in particular the rule of thirds.

Composition, i.e. if it follows the composition rules. It is very common that photographs follow the rule of thirds, where the canvas is split into six equal rectangles. The four apexes of the central rectangle, as shown in FIG. 1, indicate the points where the human attention is focused, and then where the most important part of the image should be.

There are other composition rules like:

simplicity: there are no distracting elements in the photo; this can be known if there are other elements out of the emphasis points defined by the rule of thirds that can be distinguished e.g. by colour, contrast or not related to the rest of elements present in the photo;

colors used: it is very simple to know if the colours in a composition are in the same chromatic range and then, evoking harmony;

leading lines: to lure the eye deeper into a picture or to an important subject. Straight, curved, parallel, or diagonal lines are all good at promoting interest. Good examples could be roads, rivers, streams, bridges, branches, or fences but there are endless things that could be used.

Then, the photograph can be tagged attending to each one of these composition rules indicating if each one has been followed or not.

The main subject is well focused, i.e. if in the proximity (e.g. at a radius of 5% of the shorten dimension of the canvas) to at least one of the emphasis points of the rule of thirds those pixels are in focus, the photo is tagged as "in focus".

If there are someone with closed eyes in the photo. This parameter can be used, for instance, to tag a photo as "with closed eyes" when the percentage of people with closed eyes present in a photo is more than 20%.

The number of people smiling. In that way, when the number of people smiling is >50% of people present in a photo, it is tagged as a "happy" photo.

The exposure parameters: sensitivity of the film used (or its equivalent in digital sensor sensitivity) expressed in ISO values, f-stop value (e.g. f5, f6, f8, . . . ) and shutter speed (e.g. $\frac{1}{100}$ sec, $\frac{1}{200}$ sec, etc). These parameters are usually included in the digital image file (e.g. jpeg, tiff or raw) by the camera (together with other metadata like the camera model), and they can be used to tag the photo. Moreover, it is possible to tag the photograph attending to the combination of these parameters using their graphical representation in a histogram. This histogram indicates the number of pixels for each combination of R, G and B pixels. Each pixel arranges from 0 to 255, although it depends on the bit depth used. In fact, there are three different curves for each color, i.e. one for R color, other for Green color and other for Blue color. The histogram in a black & white photo is made up one curve (because R=G=B), and then the histogram represents the number of pixels for each value, from 0 to 255.

Figure 2A:
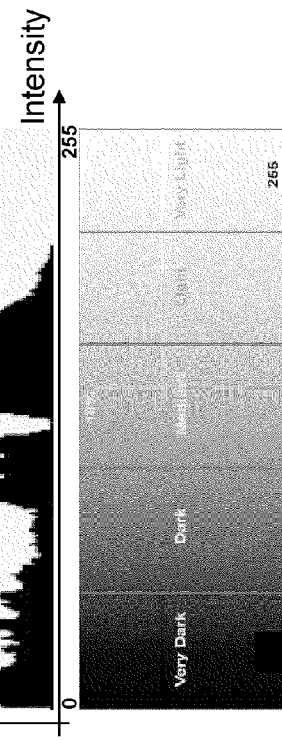
FIGS. 2A, 2B, 2C and 2D shows examples for selecting photos according to exposure parameters.

An example of a histogram can be the one represented in FIG. 2A, in which the Y-axis represents the numbers of pixel for the corresponding value (from 0 to 255), said values represented in the X-axis.

Figure 2D:
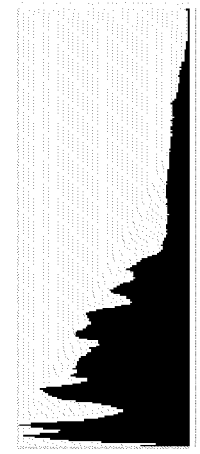
Figure 2C:
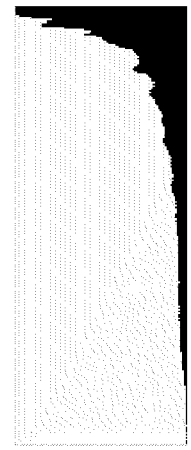
Figure 2B:
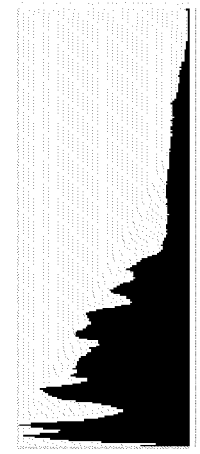

Attending to this, a photograph can be tagged as:

well exposed: there are no pure white (255) & black (0) pixels or their percentage is very low), as shown in the example of FIG. 2B;

overexposed (FIG. 2C): there are no black pixels (0) and there are a high number of pixels concentrated in the second half of the histogram (128-255), usually there are a high number of pure pixels (255) in the histogram (this information is lost and can not be recovered);

underexposed (FIG. 2D): there are no white pixels (255) and there are a high number of pixels concentrated in the first half of the histogram (0-128), usually there are a high number of black pixels (0) in the histogram.

Subjective Parameters

The subjective parameters are collected from the users' behaviour. In that case two different scenarios can be distinguished: (a) when the set of photographs is locally stored, and (b) when the set of photographs is stored in a server (e.g. Flickr). The parameters change in each case:

(a) Local photos: photos stored in the local device, e.g. mobile phone or computer. For instance:

The number of times the photo has been displayed.

Time the user has spent watching it, in that case a maximum threshold can be used: if seen more times than this threshold, the value of this parameter is the same and equals the threshold.

The number of times it has been sent to others.

If the photo has been shared or not, e.g. uploaded to a remote server.

Number of receivers of the photo.

Place where a photo has been displayed.

Density of mobile phones in your proximity when the photo is being displayed.

If it has been explicitly selected by the user.

(b) Photos in a remote server like Flickr and accessed by the user using a device like a mobile phone or computer. For instance:

The number of times the photo has been displayed in the remote server or even in other servers (i.e. references from other sites/web pages).

Time the user and/or others have spent watching it, in that case a maximum threshold can be used: if seen more times than this threshold, the value of this parameter is the same and equals the threshold.

If the photo has been shared or not.

Number of downloads of a photo.

The number of times it has been sent to others.

Number of receivers of the photo.

The number of stars.

The number of comments.

If it has been explicitly selected by the user.

The tagging phase is automatically done, because the image recognition technology is mature enough to implement it.

2. Optional Prefiltering

Discard photos according to objective and/or subjective parameters to enhance the quality of the final photo selection. This can be done by configuring a threshold for each objective parameter and comparing these ones with those generated in the tagging step. For instance, if the main subject is out of focus (the main subject will be the biggest one and will be located in the proximity of one of the emphasis points according to the rule of thirds), or if the photo is overexposed or subexposed, etc. This can also be done by choosing only the photographs previously watched or marked by a user, discarding the rest of photographs.

3. Tuning

Apply over the previous ones the rest of criteria (objective and subjective parameters) weighing them according to a relevant function. This function will provide a score for each photo to arrange the set of photos. Optionally, the function could be automatically tuned in an iterative process, e.g. using a learning mechanism based on neural networks.

The relevant function can be defined in a similar way as the table shown in FIG. 3 for the next step, optional filtering, multiplying the weights of the parameters by its presence (1) or absence (0). The purpose of the relevant function of the tuning step is to obtain a score depending of the objective and subjective parameters, tuning score $score_t$. In the following step, optional filtering, the tuning score $score_t$ is complemented with the score obtained in the filtering step, filtering score $score_f$, such that a final or total score $score_{TOTAL}$ is obtained. The total score can be obtained, for instance, by weighing the tuning score $score_t$ and the filtering score $score_f$ by configurable parameters α and β ($score_{TOTAL}=\alpha \cdot score_t + \beta \cdot score_f$). In the case that the Optional Filtering step is not relevant, i.e. the objects, places and objects which are photographed are not considered in the recommendation, the β parameter would be 0.

4. Optional Filtering

The purpose of this step, which is optional, is to select the minimum number of photos that include the people, the objects and places photographed in a set of photos. It will follow the next steps:

Making up a list of the people, the objects and places photographed (it will use a tool for identifying people, objects and places).

Configuration of the weights and relevance for these ones or a set of them (e.g. people are more important than objects and places). This configuration is made by the user or automatically by the system (e.g. people are more important than places and places more important than objects). A table as shown in FIG. 3 can be used to obtain the score of each photo, where:

P_OX is 0 or 1, indicating if the photo contains (1) or not (0) the Object X. And Weight oX indicates the relevance of object 1.

The same applies to P_PX and Weight pX for people, and P_LX and Weight lX for places.

The weights are chosen such that:

Σ(Weight $oi$+Weight $pj$+Weight $lh$)=N (for i=1 . . . number of objects, j=1 . . . number of subjects/people, h=1 . . . number of places)

The score for each photo is the addition of the results of each cell.

All the photographs are rated according to the previous configuration.

The photographs in the first places include the most quantity of information (i.e. places, people and objects).

For instance, as shown in FIG. 4A, in case we have three photographs which contains the indicated objects, people and places, the resulted score and the final order is Photo 1, Photo 2 and Photo 3. The result is shown in FIG. 4B considering that the 6 elements (people, objects and places) are equally important (weight is ⅙, that is, about 0.17). However, if people were more important than objects and places, then the order would be Photo 2, Photo 1 and Photo 3. In a general case, a particular element can have a higher weight, e.g. person 2 could be only more important than place 1.

If the final user indicates to the system that only a set of T photographs (T<K, K=total number of photos) should be selected, then the system will use the final scores to make the selection of the T photos (the T photos with higher score).

5. Show Results to the User

The photographs recommendation is shown to the user. The user can choose to iterate the procedure in step 3, tuning.

The invention claimed is:

1. A method of recommending photographs, the method comprising:

tagging each of a set of digital photographs with values that reflect a status of the digital photograph with respect to each of one or more objective parameters and one or more subjective parameters, wherein:

the objective parameters correspond to features of the digital photographs; and the subjective parameters reflect past behavior of users with respect to the digital photographs;

for each of the digital photographs, determining a total score based on the respective values corresponding to the digital photograph, comprising:

obtaining a tuning score for the digital photograph by applying a tuning weight to each of the values corresponding to the digital photograph of the tagged objective and subjective parameters and aggregating the weighted values corresponding to the digital photograph; and determining a filtering score for the digital photograph by:

identifying items present in the digital photograph;

applying a weighted value to each of the items; and aggregating the weighted values corresponding to the items in the digital photograph; and obtaining the total score for the digital photograph by aggregating the tuning score and the filtering score of the digital photograph; and providing to at least one user a recommendation of one or more of the digital photographs based on the total scores of the digital photographs.

2. The method according to claim 1, wherein the total score of each digital photograph is equal to the tuning score of the digital photograph.

3. The method according to claim 1, wherein the tuning weights are applied such that:

$$\sum_{i=1}^{k} weighT_i = M; \quad \text{and}$$

the tuning score for each digital photograph is determined by applying the following equation:

$$score_t = \sum_{i=1}^{k} weighT_i \cdot fp_i,$$

where:

k is the total number of objective and subjective parameters, $weighT_i$ is the weight assigned to the parameter i, M is the maximum tuning score obtainable;

$score_t$ is the tuning score for the digital photograph t, and $fp_i$ is a parameter-present function, wherein $fp_i$ equals 0 if parameter i is not present in the digital photograph, and $fp_i$ equals 1 if parameter i is present in the digital photograph.

4. The method according to claim 1, further comprising prefiltering the digital photographs to determine which of the digital photographs to discard based on the values of one or more of the tagged objective and subjective parameters of the digital photographs.

5. The method according to claim 4, wherein prefiltering the digital photographs comprises:
configuring a threshold value for one of the objective parameters; and
comparing the threshold value with the value of the corresponding tagged objective parameter of each digital photograph.

6. The method according to claim 1, wherein
the filtering weighted values are applied such that:

$$\sum_{i=1}^{j} weighF_i = N;\ \text{and}$$

the filtering score for each digital photograph is determined by applying the following equation:

$$score_f = \sum_{i=1}^{j} weighF_i \cdot f_i,$$

where:
j is the total number of identified items,
$weighF_i$ is the weight assigned to the item i,
N is the maximum filtering score obtainable;
$score_f$ is the filtering score for the digital photograph f, and
$f_i$ is a parameter-present function, wherein $f_i$ equals 0 if item i is not present in the digital photograph, and $f_i$ equals 1 if item i is present in the digital photograph.

7. The method according to claim 1, wherein the identified items comprise one or more of the following types: people, objects and places.

8. The method according to claim 1, wherein obtaining the total score for each of the digital photographs comprises applying the following equation for each digital photograph:

$$score_{TOTAL} = \alpha \cdot score_t + \beta \cdot score_f$$

where:
$score_{TOTAL}$ is the total score for the digital photograph,
$score_t$ is the tuning score for the digital photograph,
$score_f$ is the filtering score for the digital photograph, and
$\alpha$ and $\beta$ are configurable parameters.

9. The method according to claim 1, wherein the number of photographs provided in the recommendation is less than the total number of digital photographs of the set.

10. The method according to claim 1, wherein applying the tuning weights to the values of the tagged objective and subjective parameters of the digital photographs is performed according to a relevant function that is automatically tuned in an iterative and learning process.

11. The method according to claim 1, wherein the objective parameters applied to each photograph comprises one or more of the following:
a number of people and objects present in the photograph;
a place where the photograph was taken;
a time stamp of the photograph;
whether the photograph was post-processed;
a composition rule followed by the photograph;
a quality of focus of a main subject in the photograph;
a number of people with closed eyes in the photograph;
a number of people smiling in the photograph; and
exposure parameters of the photograph.

12. The method according to claim 1, wherein the subjective parameters applied to each photograph comprises one or more of the following:
a number of times the photograph has been displayed;
a time spent by users viewing the photograph;
a number of times the photograph has been sent to others;
a number of receivers of the photograph;
whether the photograph was explicitly selected by a user;
whether the photograph has been shared;
a number of downloads of the photograph;
a mark assigned by a user to the photograph; and
a number of comments associated with the photograph.

13. A system for recommending photographs, the system comprising:
an electronic device comprising:
storing means in which a set of digital photographs are stored; and
data processing means configured to:
tag each of the digital photographs with values that reflect a status of the digital photograph with respect to each of one or more objective parameters and one or more subjective parameters, wherein:
the objective parameters correspond to features of the digital photographs; and
the subjective parameters reflect past behavior of users with respect to the digital photographs;
for each of the digital photographs, determine a total score based on the respective values corresponding to the digital photograph, comprising:
obtain a tuning score for the digital photograph by applying a weight to each of the values corresponding to the digital photograph of the tagged objective and subjective parameters and aggregating the weighted values corresponding to the digital photograph; and
determine a filtering score for the digital photograph by:
identifying items present in the digital photograph;
applying a weighted value to each of the items; and
aggregating the weighted values corresponding to the items in the digital photograph; and
obtain the total score for the digital photograph by aggregating the tuning score and the filtering score of the digital photograph; and
provide to at least one user a recommendation of one or more of the digital photographs based on the total scores of the digital photographs.

14. The system according to claim 13, wherein the electronic device further comprises display means configured to show the at least one user the recommended digital photographs.

15. A method comprising:
selecting objective parameters and subjective parameters to apply to a set of digital photographs, the objective parameters corresponding to features of the digital photographs and the subjective parameters reflecting past behavior of users with respect to the digital photographs;
for each of the digital photographs:
determining, by one or more computer devices, a representative value for each of the selected objective and subjective parameters that reflect a status of the digital photograph with respect to the selected parameter; and determining, by the one or more computer devices, a total score for the digital photograph based on the representative values corresponding to the digital photograph, comprising:

determining a tuning score for the digital photograph by:
applying a weight to each of the values of the selected objective and subjective parameters corresponding to the digital photograph; and
aggregating the weighted values corresponding to the digital photograph; and determining a filtering score for the digital photograph by:
identifying items present in the digital photograph;
applying a weighted value to each of the items; and
aggregating the weighted values corresponding to the items in the digital photograph; and
aggregating the tuning score and the filtering score; and providing, by the one or more computer devices, a recommendation of one or more of the digital photographs to view based on a comparison of the total scores of the digital photographs.

16. The method recited in claim 15, further comprising:
for each of the digital photographs, comparing a threshold value to the representative value of one of the selected objective and subjective parameters corresponding to the digital photograph; and
removing one or more of the digital photographs from consideration based on the results of the comparison of the threshold value and the representative value of each digital photograph.

\* \* \* \* \*